July 3, 1928.
F. S. CARR
1,675,792
FASTENER
Original Filed Feb. 26, 1925
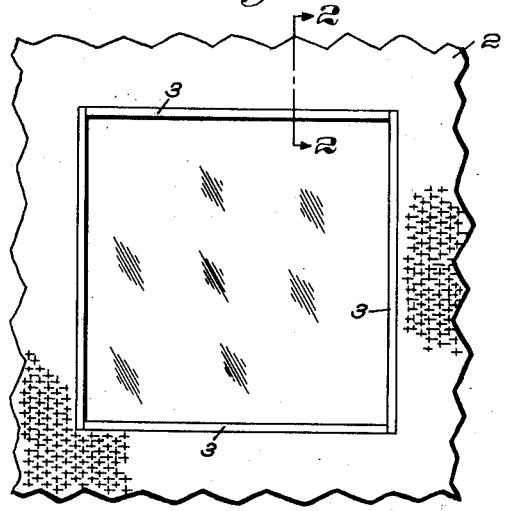
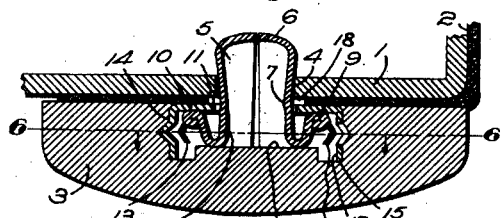
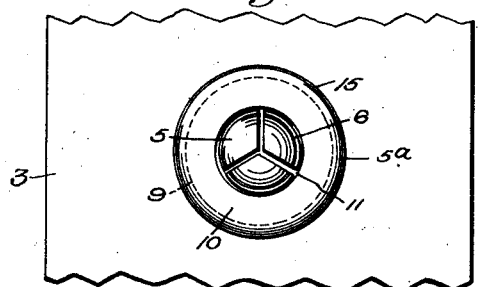
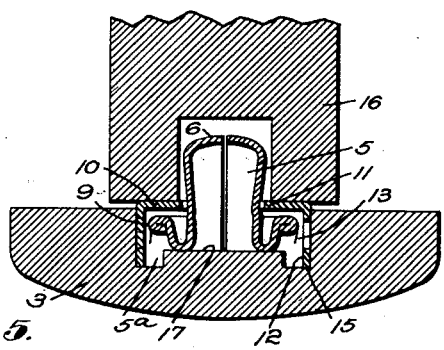
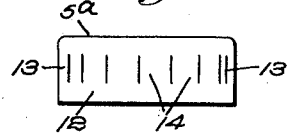
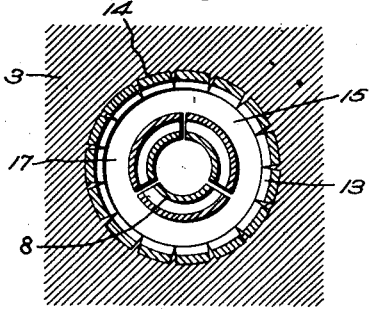
Inventor:
Fred S. Carr,
by Emery Booth Janney Varney Attys.

Patented July 3, 1928.

1,675,792

UNITED STATES PATENT OFFICE.

FRED S. CARR, OF NEWTON, MASSACHUSETTS, ASSIGNOR TO CARR FASTENER COMPANY, OF CAMBRIDGE, MASSACHUSETTS, A CORPORATION OF MAINE.

FASTENER.

Original application filed February 26, 1925, Serial No. 11,700. Divided and this application filed August 25, 1925. Serial No. 52,322.

This invention aims to provide improvements in separable fasteners and more particularly to a stud unit.

The application is a division of my prior application, Serial No. 11,700, filed February 26, 1925.

In the drawings, which illustrate a preferred embodiment of my invention:—

Fig. 1 is an elevation view of a window and window frame showing one use of my invention;

Fig. 2 is a section on the line 2—2 of Fig. 1, showing the trim strip secured to the window frame by stud and socket fastening means;

Fig. 3 is a plan view of a portion of the trim strip showing a stud unit secured thereto;

Fig. 4 is a section of the trim strip showing one of the stud units being secured thereto by the use of a suitable tool;

Fig. 5 includes a side elevation and an under side view of the casing part of the stud unit; and Fig. 6 is a plan section on the line 6—6 of Fig. 2.

Referring to the drawings, I have shown a quick detachable trimming strip particularly, though not exclusively, useful in vehicle body construction where a neat edge strip, which may be removed for access to underlying parts, is required.

The installation illustrated includes a frame part or body part 1, herein shown as sheet metal, an upholstery fabric 2 for covering inside portions of the body part 1 and a wooden trim strip 3. The wooden trim strip is secured to the body part by stud and socket fasteners so that the strip may be easily and quickly applied to or taken from the frame part 1. When the strip is assembled with the rest of the installation, the stud and socket fastening elements are concealed by the strip as is the edge of the upholstery fabric 2, thus providing a neat installation with no exposed metal fastening means.

The stud and socket fastening means include stud-receiving apertures 4 formed in the body part as shown in Fig. 2, and stud units presenting resilient aperture-engaging stud parts 5 and casing parts 5ª. The resilient aperture-engaging part 5 includes a head 6, a neck 7, shank portion 8 and reinforced base 9 substantially as shown and described in my co-pending application Serial No. 10,882, filed herewith. The casing part 5ª is pressed from a single piece of metal and has a front face 10 presenting an aperture 11 therethrough and a peripheral wall portion 12, having a series of short narrow slits 13 which form a series of easily distortable portions 14 providing means for attaching the casing to the trim strip as more fully hereinafter described.

Assembly of the stud units with the trim strip is effected by first forming recesses 15 in the trim strip 3 and then placing a stud part 5 and casing part 5ª into each recess as shown in Fig. 2. One edge of the wall portion 12, of one of the stud units, seats against the bottom of the recess and fits the wall closely so that, when pressure is exerted upon the casing 5ª by the tool 16 (Fig. 4), the easily distortable portions 14 may be forced outwardly from the wall portion 12 into the wall of the recess in the trim strip as shown in Figs. 2 and 6. These distorted wedge-shaped portions 14 grip the wood firmly and hold the stud parts in assembled relation with the trim strip. A slightly raised portion or boss 17 is provided at the bottom of each recess 15 to take up the excess space between the bottom of the recess against which the casing seats and the bottom of the aperture-engaging stud part 5, thereby preventing unnecessary movement between the parts of the stud unit.

When the stud units are completely assembled with the trim strip 3, the front face 10 of the casing 5ª lies flush with the inner face of the trim strip 3 and the head and neck of the aperture-engaging part extends through the aperture 11 and beyond the inner face of the trim strip.

To provide for misalignment of stud heads with their cooperating apertures, and thereby do away with the neceessity of accurate and expensive machine work, I have provided means for permitting the aperture-engaging parts to shift laterally relative to their casings, for alignment with their cooperating apertures presented by the body part 1. This lateral shifting is permitted by providing a casing 5ª and aperture 11 relatively larger in diameter than the base 9 and neck 7 of the aperture-engaging part 5.

When the parts of the installation are completely assembled, as shown in Fig. 2, the heads 6 and necks 7 of the stud units pass through apertures 18 in the upholstery fabric and engage the walls surrounding the apertures 4. Thus the edge of the upholstery fabric is gripped tightly between the trim strip and the body part 1 as shown in Fig. 2.

While I have shown and described a preferred embodiment of my invention, it will be understood that I have done so for purposes of clarification and not limitation, my invention being best defined in the appended claims.

Claims:

1. A fastener stud unit including a casing having a collapsible peripheral wall portion for securing said casing to a support and a socket-engaging stud part assembled with said casing and adapted to be secured to said support by the collapsible wall portion of said casing.

2. A fastener stud unit including a casing having a collapsible peripheral wall portion for securing said casing to a support and a socket-engaging stud part held in position by said casing for engagement with a suitable socket, said socket-engaging part shiftable laterally relative to said casing for alignment with a stud-receiving aperture presented by said suitable socket.

3. A fastener stud unit including a casing having a peripheral wall presenting a series of fingers between two continuous portions, said fingers adapted to be forced outwardly to secure said casing to a support, and a socket-engaging stud member having a base within said casing, and a head and neck portion extending through and beyond said casing, said stud shiftable laterally relative to said casing for engagement with a socket.

4. A fastener stud unit including a casing having a peripheral wall presenting a series of fingers between two continuous portions, said fingers adapted to be forced outwardly to secure said casing to a support, and a socket-engaging stud member having a base within said casing and a contractible and expansible head and neck portion extending through and beyond said casing, said stud shiftable laterally relative to said casing for engagement with a socket.

5. A fastener stud unit comprising, in combination, a casing part and a resilient stud part, said stud part shiftable to a limited extent in any transverse direction relative to said casing part when secured to a support, and said casing part presenting an aperture through which a portion of the stud is exposed and a collapsible peripheral wall for engagement with a support to secure the stud unit thereto.

In testimony whereof, I have signed my name to this specification.

FRED S. CARR.